(12) United States Patent
Ito

(10) Patent No.: US 8,300,946 B2
(45) Date of Patent: Oct. 30, 2012

(54) IMAGE PROCESSING APPARATUS, IMAGE PROCESSING METHOD, AND COMPUTER PROGRAM

(75) Inventor: Naoki Ito, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1228 days.

(21) Appl. No.: 11/748,357

(22) Filed: May 14, 2007

(65) Prior Publication Data

US 2007/0262992 A1    Nov. 15, 2007

(30) Foreign Application Priority Data

May 15, 2006    (JP) ................................. 2006-135072

(51) Int. Cl.
*G06K 9/00*    (2006.01)
(52) U.S. Cl. .......................... 382/197; 345/467; 382/173
(58) Field of Classification Search .................. 382/173, 382/197
See application file for complete search history.

(56) References Cited

U.S. PATENT DOCUMENTS

| | | | |
|---|---|---|---|
| 4,771,474 A * | 9/1988 | Takashima et al. | 382/241 |
| 5,204,752 A * | 4/1993 | Yamakawa | 358/296 |
| 5,867,172 A * | 2/1999 | Fujisawa et al. | 345/467 |
| 5,878,161 A | 3/1999 | Ishida et al. | |
| 6,404,921 B1 | 6/2002 | Ishida | |

FOREIGN PATENT DOCUMENTS

| | | |
|---|---|---|
| JP | 08-044848 A | 2/1996 |
| JP | 2001-052188 A | 2/2001 |
| JP | 2005-174227 A | 6/2005 |
| JP | 2005-326756 A | 11/2005 |
| JP | 2006-106972 A | 4/2006 |

OTHER PUBLICATIONS

Basics and Application of Digital Image Processing, second edition, Koichi Sakai, ISBN4-7898-3707-6, CQ Publishing, issued in Feb. 1, 2004, pp. 51 to 54.
Mori, et al. "Paper Document Digitization Using Shapes Represented by Function Approximation", 1999 , Japan.

* cited by examiner

*Primary Examiner* — Hadi Akhavannik
(74) *Attorney, Agent, or Firm* — Canon USA, Inc., IP Division

(57) ABSTRACT

An input image is divided into a plurality of regions, and it is determined whether each of the divided regions is suitable for thinning processing. In accordance with a result of the determination, an outlining processing is selected to generate outline data (vector data) for each of the regions. The generated outline data is output. For example, a character region and a drawing region are discriminated from each other and outline data having a format suitable for a discriminated type of region is generated. In addition, generation of outline data (vector data) which pass through a center line of the line drawing or generation of outline data (vector data) indicating a contour of a drawing is automatically selected. Furthermore, in accordance with the size of a character, function-approximation processing may be selected.

24 Claims, 7 Drawing Sheets

IMAGE PROCESSING APPARATUS, IMAGE PROCESSING METHOD, AND COMPUTER PROGRAM

BACKGROUND OF THE INVENTION

1. Field of the Invention

The present invention relates to apparatuses which generate vector information on the basis of character images or linear-drawing images included in drawings or document images and methods therefor.

2. Description of the Related Art

In recent years, there has been a growing need for paperless environments, and therefore, existing image data has often been digitalized to be reused. A method for reuse of image data has been proposed in which the image data is subjected to binarizing processing and is converted into vector data using a vectorizing technique, and the vector data is utilized in CAD software or the like.

For example, U.S. Pat. No. 6,404,921 (JP Patent No. 3026592) discloses a method for vectorizing a binary image. Specifically, U.S. Pat. No. 6,404,921 discloses "a contour extraction method for raster-scanning an input image in a pixel matrix, and in accordance with a state of plural pixels in the pixel matrix, extracting a contour vector located at a boundary between a black pixel, wherein the contour vector is defined by a loop of connected vectors, wherein the coordinate of the extracted contour vector is registered in a first table and, when a vector flowing into or out of the contour vector is undetermined in the case that the state of the pixels represents a start portion in the main scanning or the sub-scanning, the vector is registered in a second table, and wherein the coordinate of the extracted contour vector is registered in the first table, and, when a vector flowing into or out of the contour vector by searching through the second table in the case that the state of the pixels represents an end portion in the main scanning or the sub-scanning, the vector is registered in the first table". U.S. Pat. No. 6,404,921 shows an effect in which, since all contours in the image are extracted in one raster-scanning and image memory for storing all image data is not required, memory capacity can be reduced.

U.S. Pat. No. 5,878,161 (JP Patent No. 3049672) discloses an image processing apparatus which obtains a high-quality image which has been subjected to magnification-varying processing using contour data of a binary image. U.S. Pat. No. 5,878,161 (JP Patent No. 3049672) discloses a technique in which an outline vector is extracted from a binary image and the extracted outline vector is subjected to magnification-varying processing to obtain an outline vector with desired magnification whereby a high-quality digital binary image with a desired magnification is obtained.

Contour data of a binary image may be generated by performing function-approximation processing using lines and Bezier curves.

In the techniques of generating outline vectors on the basis of contours disclosed in, for example, U.S. Pat. No. 6,404,921 and U.S. Pat. No. 5,878,161, vector data representing a contour of a line drawing including a line and a curve is also generated. Such contour vector data is generated as loop-shaped vector data generated in accordance with a boundary (a contour) between black pixels and white pixels. That is, the contour vector data is suitably used when the drawing is reused as is or when the drawing is reused as is after being subjected to only magnification-varying processing.

Meanwhile, there may be a situation in which the drawing is reused, for example, after only changing the thickness of lines or curves or by only changing the length or curvature of the drawing. However, although contour vector data representing a contour of the drawing is a suitable form for performing magnification-varying processing on the whole drawing while keeping the shape as is, contour vector data is not a suitable form when only the thickness or the length of the drawing is changed. As described above, when only the thickness is changed, for example, linear drawings such as lines and curves may preferably be represented using a linear vector indicating a center line and line-thickness data, instead of contour vector data.

However, in the related art, such a technique in which vectorizing methods are suitably changed has not been considered.

Furthermore, the size of characters included in an image is not fixed even in business documents, and therefore, characters having different fonts and different sizes may appear in a document. If similar vectorizing methods are applied to all of the characters having different fonts and different sizes, desired character forms may not be obtained and the amount of data is increased considerably.

SUMMARY OF THE INVENTION

According to an aspect of the present invention, there is provided an image processing apparatus including: a region segmentation unit configured to divide an input image into a plurality of regions; a selection unit configured to determine whether each of the divided regions is suitable for thinning processing and configured to select outlining processing to be executed based on a result of the determination; an outlining unit configured to generate outline data for each of the regions using the outlining processing selected by the selection unit; and an outputting unit configured to output outline data generated by the outlining unit.

According to another aspect of the present invention, there is provided an image processing apparatus including: a region segmentation unit configured to divide an input image into a plurality of regions; an outlining unit configured to generate outline data for each of the regions using the outlining processing; a function approximation unit configured to perform function-approximation processing using only straight-line approximation on the character image which has been subjected to the outlining processing when the size of the character image is equal to or smaller than a second threshold value when a character image included in a region having a character attribute among the divided regions is subjected to outlining processing, and to perform function-approximation processing using Bezier approximation processing on the character image which has been subjected to the outlining processing when the size of the character image is larger than the second threshold value; and an output unit configured to output outline data which has been subjected to the function-approximation processing.

Accordingly, processing suitable for individual images to be subjected to vectorizing processing can be automatically selected to obtain vector data suitable for the individual images.

For example, a character region and a drawing region are discriminated from each other and outline data having a format suitable for each of the regions is generated. In addition, generation of outline data which pass through a center line of the line drawing or generation of outline data indicating a contour of a drawing is automatically selected.

If function-approximation processing using Bezier curves is applied to small characters, qualities of the characters may be deteriorated. To address this problem, when outline vector data is subjected to function-approximation processing, Bezier curves and lines are selectively used in accordance with the size of the characters. Accordingly, the qualities of character shapes are improved. In addition, since extremely small characters are not converted into outline data, processing efficiency may be enhanced.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

First Embodiment

Figure 2:
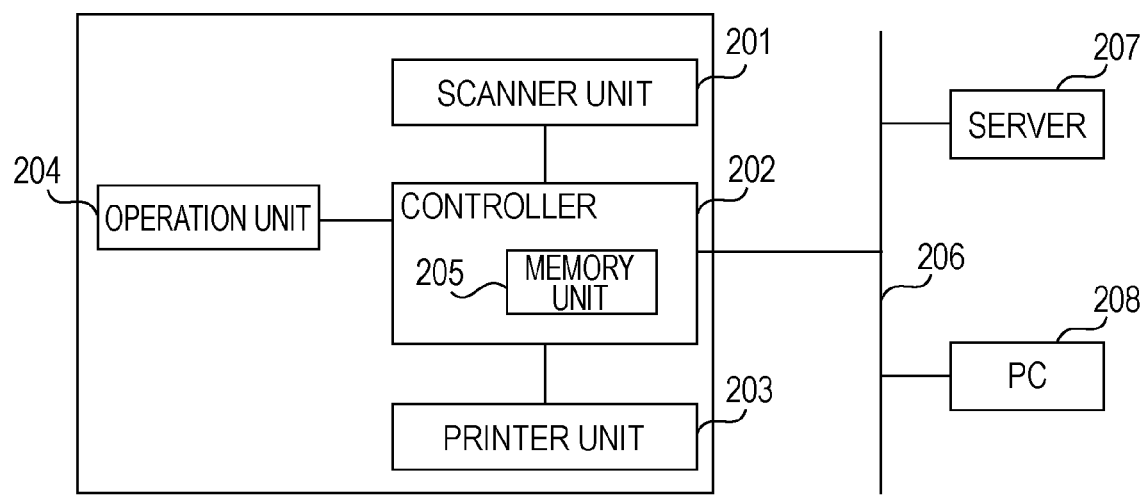
FIG. 2 is a block diagram showing an image processing apparatus to which the present invention is applied.

An image processing apparatus of a first embodiment can be implemented by, for example, a digital complex machine having functions such as those of a scanner, a copier, a printer, and a facsimile. FIG. 2 shows a block diagram showing an image processing apparatus of the first embodiment. In FIG. 2, the image processing apparatus includes a scanner unit 201, a controller 202, a printer unit 203, an operation unit 204, and a memory unit 205. The scanner unit 201 reads a document. The controller 202 performs image processing on an image read using the scanner unit 201, stores the processed image in the memory unit 205, and controls a variety of processing. The operation unit 204 is a user interface which sets various printing conditions for printing the image read using the scanner unit 201 and receives various instructions from a user. The printer unit 203 is used to print (form an image), on a recording sheet, an image read as image data from the memory unit 205 in accordance with the printing conditions set using the operation unit 204. The image processing apparatus is connected to, for example, a personal computer (PC) 208 which instructs a server 207 which manages the image data and the image processing apparatus to execute printing through a network 206.

Figure 1:
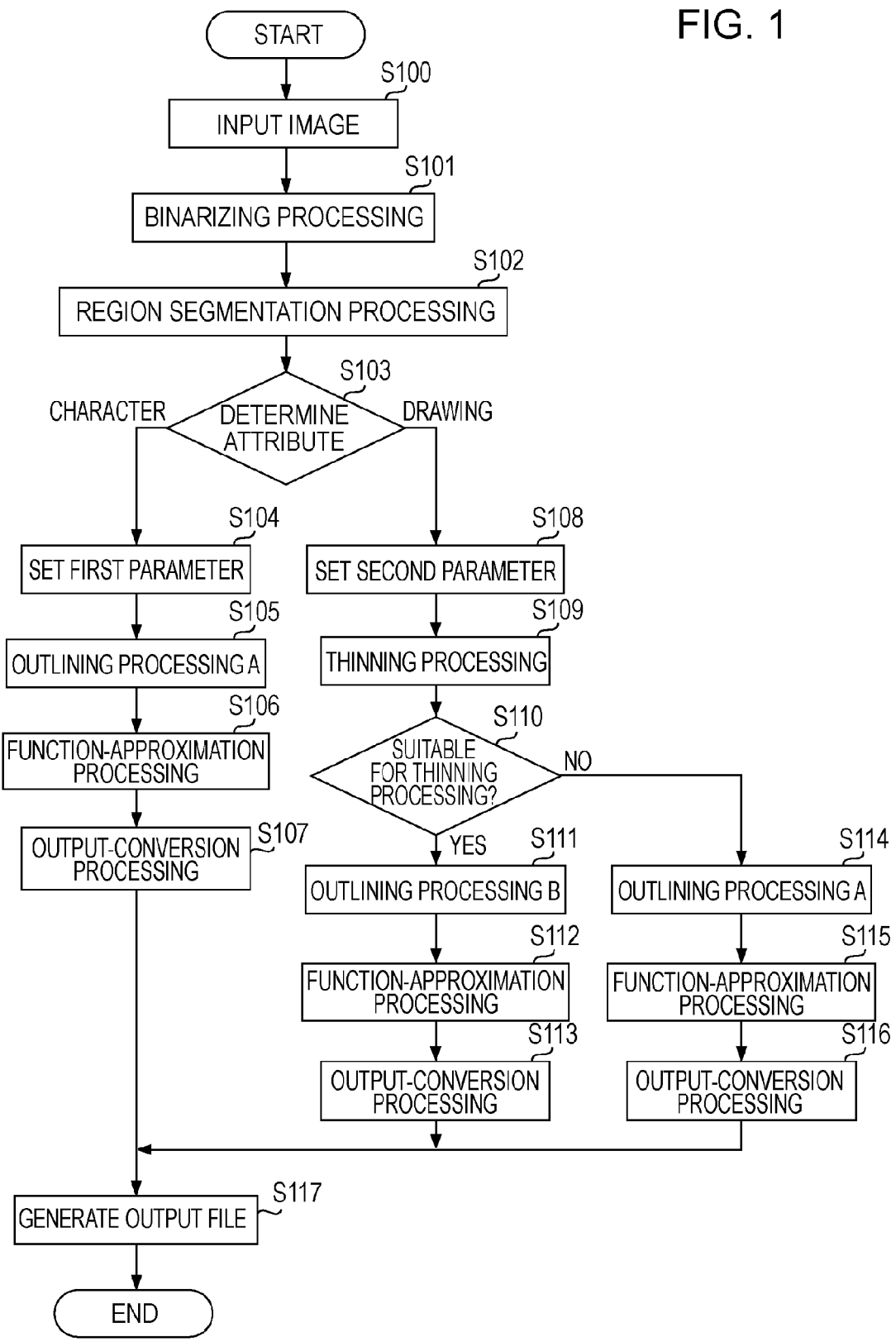
FIG. 1 shows a flowchart illustrating processing of a first embodiment.

FIG. 1 shows a processing flow of the first embodiment.

In step S100 (image input processing), image data generated by reading a document using the scanner unit 201 and image data transmitted through a network from another apparatus are input to the image processing apparatus.

In step S101 (binarizing processing), the input image is subjected to binarizing processing using known binarizing processing. Note that any binarizing processing may be used and, for example, a luminance value of the input image is binarized using a predetermined threshold value. Here, when the input image is a binary image, the binarizing processing may be omitted.

In step S102 (region segmentation processing/attribute discrimination processing), the binary image data is subjected to region segmentation processing and attribute discrimination processing. Here, regions included in the input binary image data are discriminated between regions (block-shaped regions) of characters, drawings, lines, and tables, and attribute information is given to each of the regions.

For example, the region segmentation processing and attribute discrimination processing may be performed using the following processing. First, tracing of contours of the black pixels of the binary image obtained after binarizing processing is performed, and the binary image is divided into regions by extracting pixel blocks surrounded by contours of black pixels. Furthermore, for black pixel blocks having a large area, contours of white pixels in the black pixel blocks having a large area are traced, whereby white pixel blocks are extracted. Furthermore, black pixel blocks are recursively extracted from the insides of white pixel blocks having an area equal to or larger than a predetermined area. The black pixel blocks obtained as described above are discriminated by size and shape, and categorized into regions having different attributes. For example, a pixel block having an aspect ratio of approximately 1 and having a size within a predetermined range is set as a character pixel block. If some character pixel blocks are arrayed in the vicinity of one another, the character pixel blocks are grouped, and character rows are defined. Furthermore, character rows having the same forms and located within a predetermined distance are grouped to be discriminated as a character region. Flat pixel blocks are set as line regions. In addition, a region defined by a black pixel block including rectangular white pixel blocks which are arrayed and which have a size equal to or larger than a predetermined size is set as a table region. A region in which various shapes of pixel blocks are distributed is set as a photograph region. A region other than the regions described above is set as a drawing region, for example.

In step S103, it is determined whether a given attribute is a first attribute or a second attribute for each region. In the first embodiment, the first attribute denotes a character attribute and the second attribute denotes a drawing attribute. When it is determined that the given attribute is a first (character) attribute, the process proceeds to step S104 whereas when it is determined that the given attribute is a second (drawing) attribute, the process proceeds to step S108.

In step S104, a parameter which is used in the following steps (in steps S105 and S106) is set. In step S104, a parameter suitable for processing regions having a first attribute (a character attribute) is read from a memory unit and is set to the regions. Note that step S104 where a first parameter is set may be performed only when parameter setting needs to be changed (that is, only when an attribute of the regions to be processed is changed).

In step S105 (outlining processing A), outline vector data (a coarse contour vector) representing a contour is generated in accordance with the contour shape of an object (here, a character image).

In step S106 (function-approximation processing), the outline vector data generated in step S105 is converted into smooth outline data using Bezier function-approximation processing, for example. In step S105, since the shape of pixels constituting a contour is vectorized in order to obtain vector data, the vector data includes the influence of jaggies. However, the coarse outline vector data is converted into smooth outline data by being subjected to the function-approximation processing in step S106, and therefore, when an original image represented by the outline data is enlarged at a time of reuse thereof, the degree of enlargement of the jaggies in the enlarged image is reduced.

In step S107 (output-conversion processing), a description of the outline data of the region generated in step S106 is converted so as to match a format of an output file. Note that it may be determined whether characters in a character attribute region are written horizontally or vertically and information about the determination may be added before the outline data is output.

On the other hand, in step S103, when it is determined that the given attribute is the second attribute (a drawing attribute), the process proceeds to step S108.

In step S108, a second parameter which is used in the following steps (in steps S109 to S116) is set. In step S108, a parameter suitable for processing a drawing region having a second attribute (a drawing attribute) is read from a memory unit and is set to the regions. Note that step S108 where a second parameter is set may be performed only when parameter setting needs to be changed (that is, only when an attribute of the region to be processed is changed).

Figure 4A:
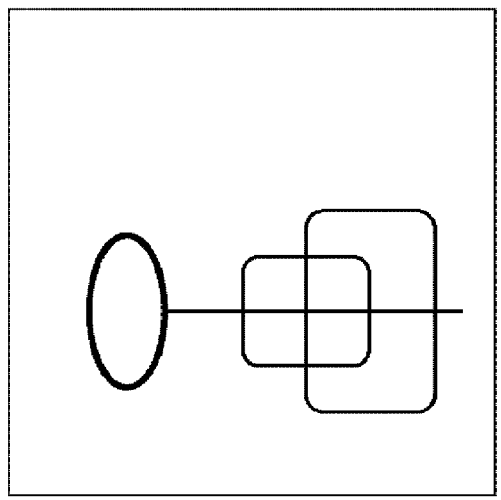
FIGS. 4A to 4D are examples of a drawing image to be subjected to outlining processing.
Figure 4B:
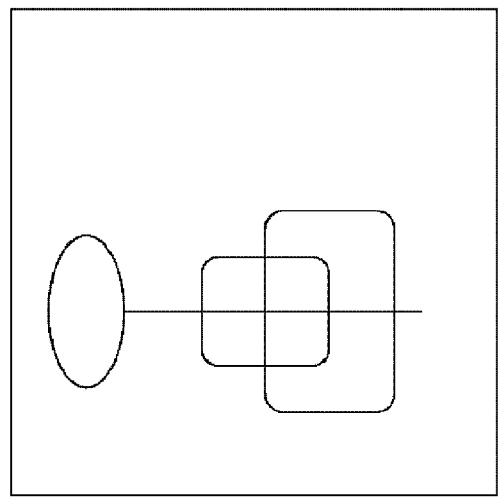

In step S109 (thinning processing), the binary image is subjected to thinning processing using a known binary-image thinning method and the processed binary image is output. An example of the known binary-image thinning method is the Hilditch thinning algorithm ("Basics and Application of Digital Image Processing", second edition, Koichi SAKAI, ISBN4-7898-3707-6, CQ Publishing, issued in Feb. 1, 2004, pp. 51 to 54). FIG. 4A shows an example of an input binary image. When the input binary image shown in FIG. 4A is subjected to thinning processing, a thinning-processed binary image shown in FIG. 4B is generated.

For example, thinning processing is repeated a predetermined number of times (five times, for example) so that black pixel portions of a drawing object are thinned on a pixel-by-pixel basis starting from pixels located in edge portions, whereby the black pixel portions of the object are thinned to have a width of one pixel. Note that when each of the black pixel portions is thinned and has a width of one pixel before the thinning processing has been repeated the predetermined number of times, the thinning processing is terminated.

In step S110, it is determined whether the drawing region is suitable for thinning processing in accordance with whether the thinning processing is successful. For example, if the thinning processing is terminated within the predetermined number of times the thinning process is repeated, the drawing region is determined to be a region suitable for thinning processing, and the process proceeds to step S111. On the other hand, if the thinning processing is not terminated within the predetermined number of times the thinning processing is repeated, the drawing region is determined to be a region not suitable for thinning processing, and the process proceeds to step S114.

Figure 4C:
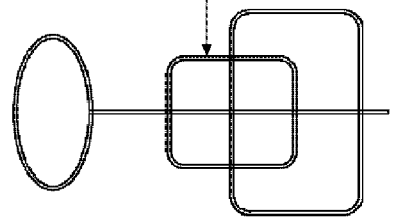
Figure 4D:
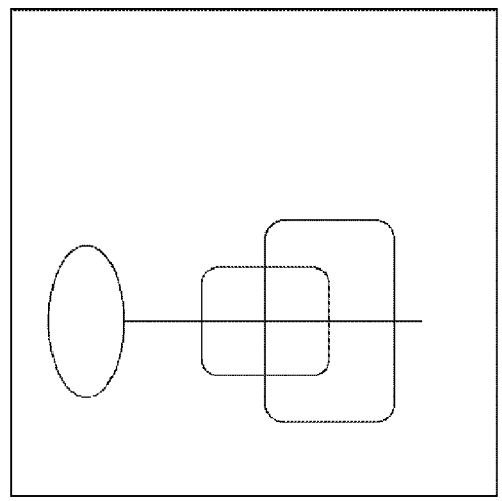

In step S111 (outlining processing B), edge points and intersecting points of the drawing object which has been subjected to the thinning processing are detected. Thin lines which connect the detected edge points and the intersecting points are obtained, and outline vector data for each of the thin lines is generated on the basis of a contour of a corresponding one of the thin lines. Here, pieces of outline vector data (surround vector data) for thin lines (linear elements) surrounding thin lines which connect the edge points and intersecting points are generated. Then, the pieces of surround vector data are converted into surround vector data for a vector connecting the edge points of the linear elements. In the conversion processing, for example, the pieces of surround vector data are considered to be vector data in which pieces of vector data for corresponding linear elements adjacent to each other are connected at edge points thereof. For the adjacent two pieces of surround vector data, orientation of one of the two pieces of surround vector data is controlled so as to pass through a center line of the two pieces of surround vector data. In FIG. 4C, a contour image is shown which is generated using pieces of surround vector data generated for individual linear elements after edge points and intersecting points of the image shown in FIG. 4B which has been subjected to thinning processing are detected, linear elements between the edge points and the intersecting points are obtained, and the linear elements are converted into vector data. In FIG. 4D, pieces of surround vector data for the corresponding linear elements (pieces of core-line vector data between adjacent edge points) converted from pieces of surround vector data for linear elements between the edge points and the intersecting points shown in FIG. 4C are shown.

In step S112, the outline vector data generated in step Sill is converted into smooth outline vector data using Bezier function-approximation processing, for example.

In step S113 (output-conversion processing), a description of the outline data of the region generated in step S112 is converted so as to match a format of an output file.

On the other hand, in step S110, when it is determined that the drawing area is not suitable for thinning processing, outlining processing (vectorizing processing) is performed in step S114. The vectorizing processing performed in step S114 is the same as the outlining processing A performed in step S105. That is, outline vector data (a coarse contour vector) which represents a contour of an object (here, the drawing image) is generated in accordance with the shape of the contour.

In step S115, the outline vector data generated in step S114 is converted into smooth outline data using Bezier function-approximation processing, for example.

In step S116, a description of the outline data of the region generated in step S115 is converted so as to match a format of an output file.

After performing output conversion processing (step S107, step S113 or step S116), in step S117, pieces of outline vector data generated in different regions are integrated to generate an output file having a desired format.

Figure 3:
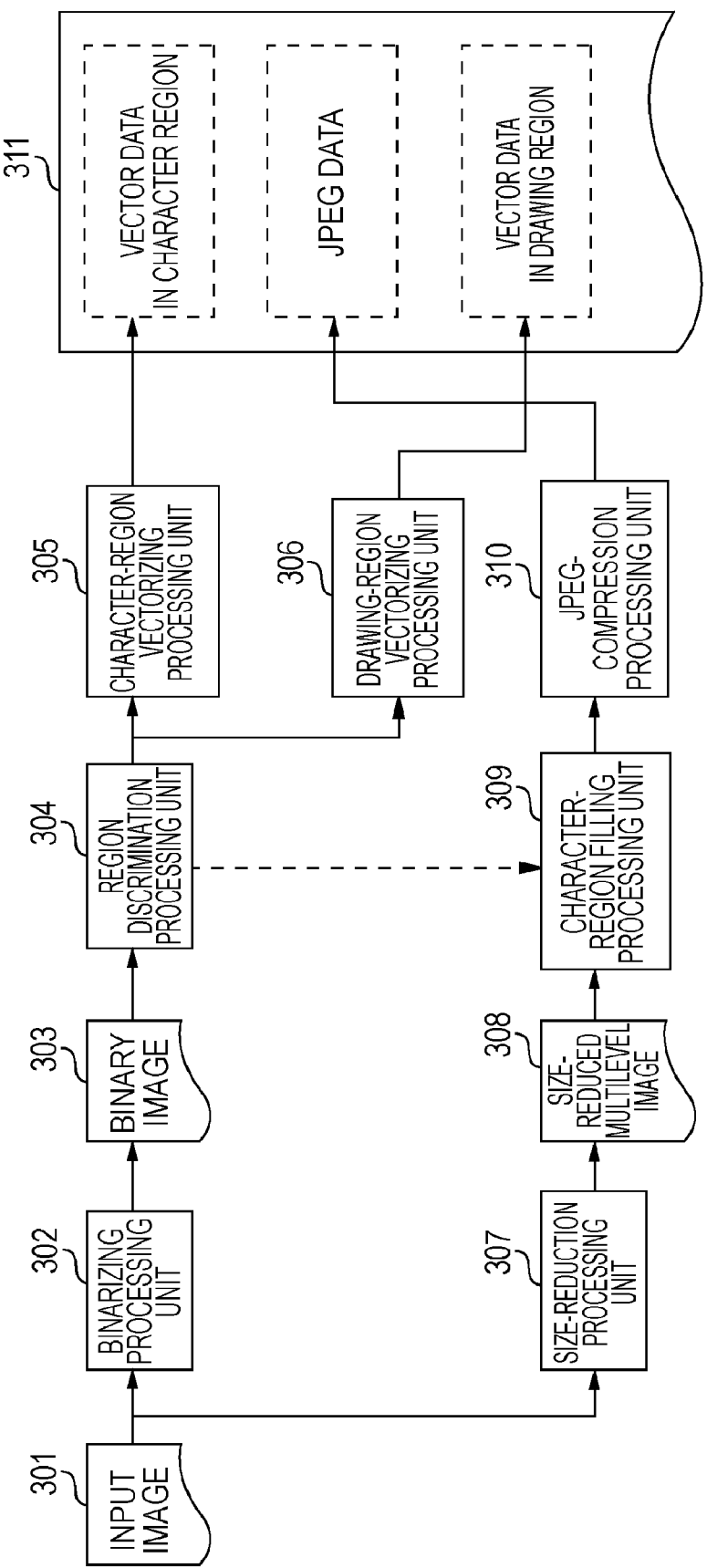
FIG. 3 shows an example of a format of an output file.

The output file generated in this embodiment has a format of a layer structure 311 in FIG. 3. In FIG. 3, an input image 301 is input to a binarizing processing unit 302 which performs binarizing processing in step S101 to generate a binary image 303. A region discrimination processing unit 304 performs region segmentation processing and attribute discrimination processing performed in step S102. A character-region vectorizing processing unit 305 performs processing from steps S104 to S107. A drawing-region vectorizing processing unit 306 performs processing from steps S108 to S116. A size-reduction processing unit 307 performs resolution conversion processing on the input image 301 to generate a size-reduced multilevel image 308. A character-region filling processing unit 309 references a result of region discrimination by the region discrimination processing unit 304, and changes the color of pixels corresponding to a character-image portion to the color of background pixels surrounding the character-image portion, whereby filling processing is performed for the character-image portion. A JPEG-compression processing unit 310 performs JPEG compression on the size-reduced multilevel image which has been subjected to character-region filling processing (color changing processing) to generate JPEG data. An output file 311 has a format which is configured to store the outline vector data for the character region generated in the character-region vectorizing processing unit 305, the JPEG data generated in the JPEG-compression processing unit 310, and the outline vector data for the drawing region generated in the drawing-region vectorizing processing unit 306 and is configured to reproduce the data in this order. With this configuration, when the output file 311 is simply reproduced to display, the character region is displayed on the JPEG data which is a background using the outline vector data. Accordingly, characters are clearly displayed as an image having high readability. When the drawing region is reused in a drawing application, the vector data for the drawing region which is stored in the output file may be conveniently reused. Furthermore, the fine-line vector data (vector data generated in step S113) for the drawing region may be used. Accordingly, when a drawing application is used, outline vector data which facilitates change of the width and length of a drawing line can be generated.

In step S109, the number of times thinning processing is repeated is set to five. However, the number of times thinning processing is repeated is not limited to this and may be changed according to need. A user may set the number of times thinning processing is repeated using the operation unit 204. The number of times thinning processing is repeated may be set in accordance with a size (an area) of a drawing image which is determined in step S103 where an attribute is determined.

Second Embodiment

Figure 5:
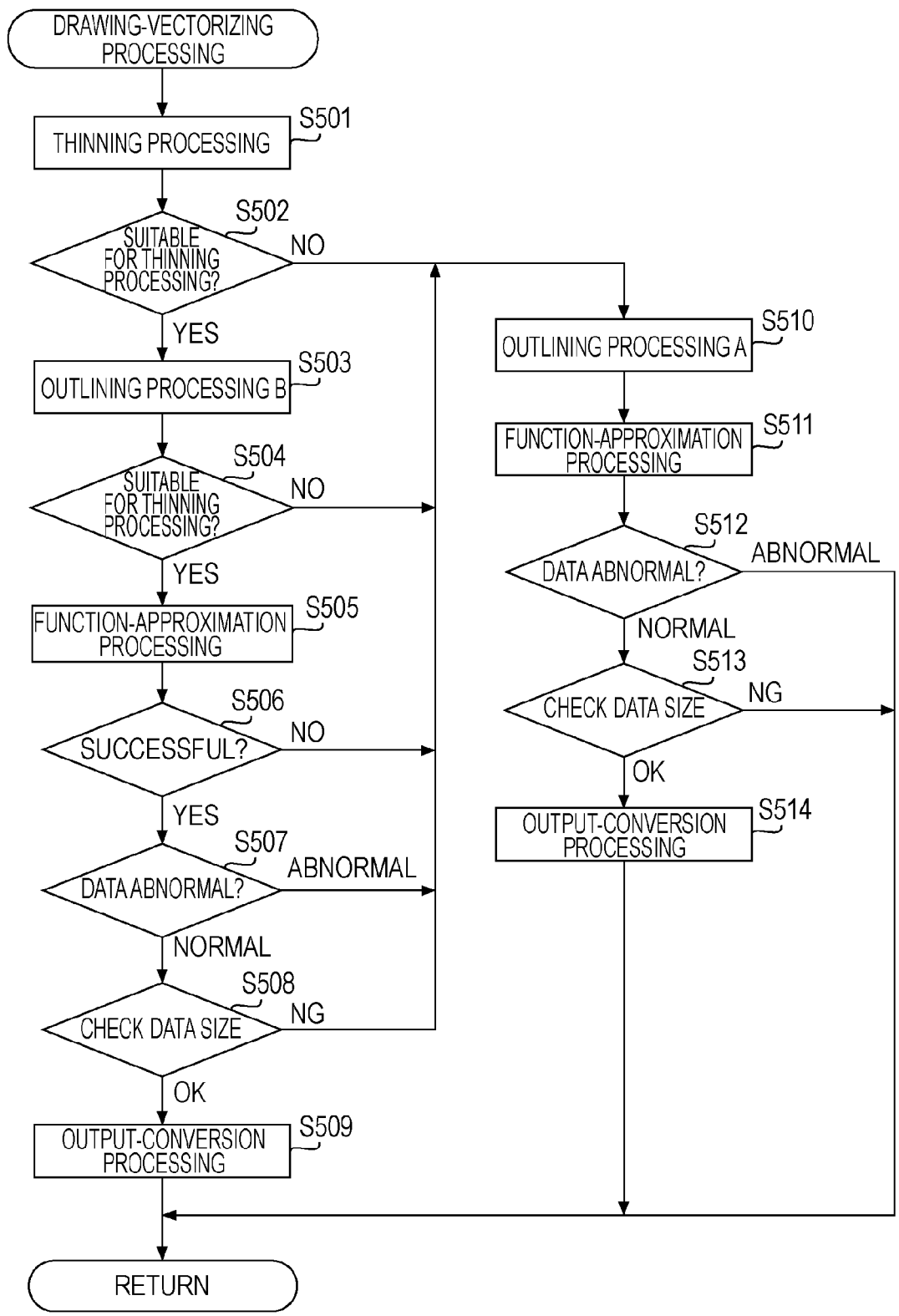
FIG. 5 shows a flowchart illustrating processing of a second embodiment.

A second embodiment concerns processing different from the processing performed when it is determined that a given attribute is a drawing attribute in step S103 shown in FIG. 1 in the first embodiment. That is, steps S108 to S116 correspond to processing depicted in flowcharts shown in FIGS. 5 and 6.

In step S501, an image in a drawing region is subjected to thinning processing similarly to step S109.

In step S502, in accordance with a result of the thinning processing, it is determined whether the drawing region is suitable for the thinning processing. When the determination is affirmative, the process proceeds to step S503, whereas when the determination is negative, the process proceeds to step S510.

In step S503, similarly to step S111, pieces of outline vector data (surround vector data) representing a contour are generated on the basis of linear elements which connect the edge points and intersecting points of the drawing image which has been subjected to thinning processing. The pieces of outline vector data are subjected to core-line processing and auxiliary-point (a control point of outline vector data) generation processing so that the linear elements which connect the edge points and intersecting points and which are represented by pieces of outline vector data are connected to one another to generate vector data.

In step S504, it is determined whether the drawing region is suitable for the thinning processing in accordance with whether the outline vector data is properly generated. When the determination is affirmative, the process proceeds to step S505, whereas when the determination is negative, the process proceeds to step S510.

In step S505, function-approximation processing is performed to obtain smooth outline vector data. In step S506, it is determined whether the function-approximation processing is successful. When the determination is negative, the process proceeds to step S510, whereas when the determination is affirmative, the process proceeds to step S507.

In step S507, it is determined whether outline vector data (which represents a control point such as an anchor point) generated through the function-approximation processing is abnormal or normal. For example, it is determined whether a coordinate point which is apparently abnormal is included. This determination is made because a coordinate point which is apparently located far from the drawing area may be calculated as a control point due to the influence of noise. Such an abnormal coordinate point leads to deterioration of the shape of the drawing. When it is determined that the outline vector data has an abnormal coordinate point, the process proceeds to step S510, whereas when it is determined that the outline vector data does not have an abnormal coordinate point, the process proceeds to step S508. In the second embodiment, when it is determined that the outline vector data includes an abnormal coordinate point, the process proceeds to step S510. However, when it is determined that the outline vector data includes a small number of abnormal coordinate points (for example, only one abnormal coordinate point), the abnormal coordinate point may be deleted and the process may proceed to step S508.

Figure 6:
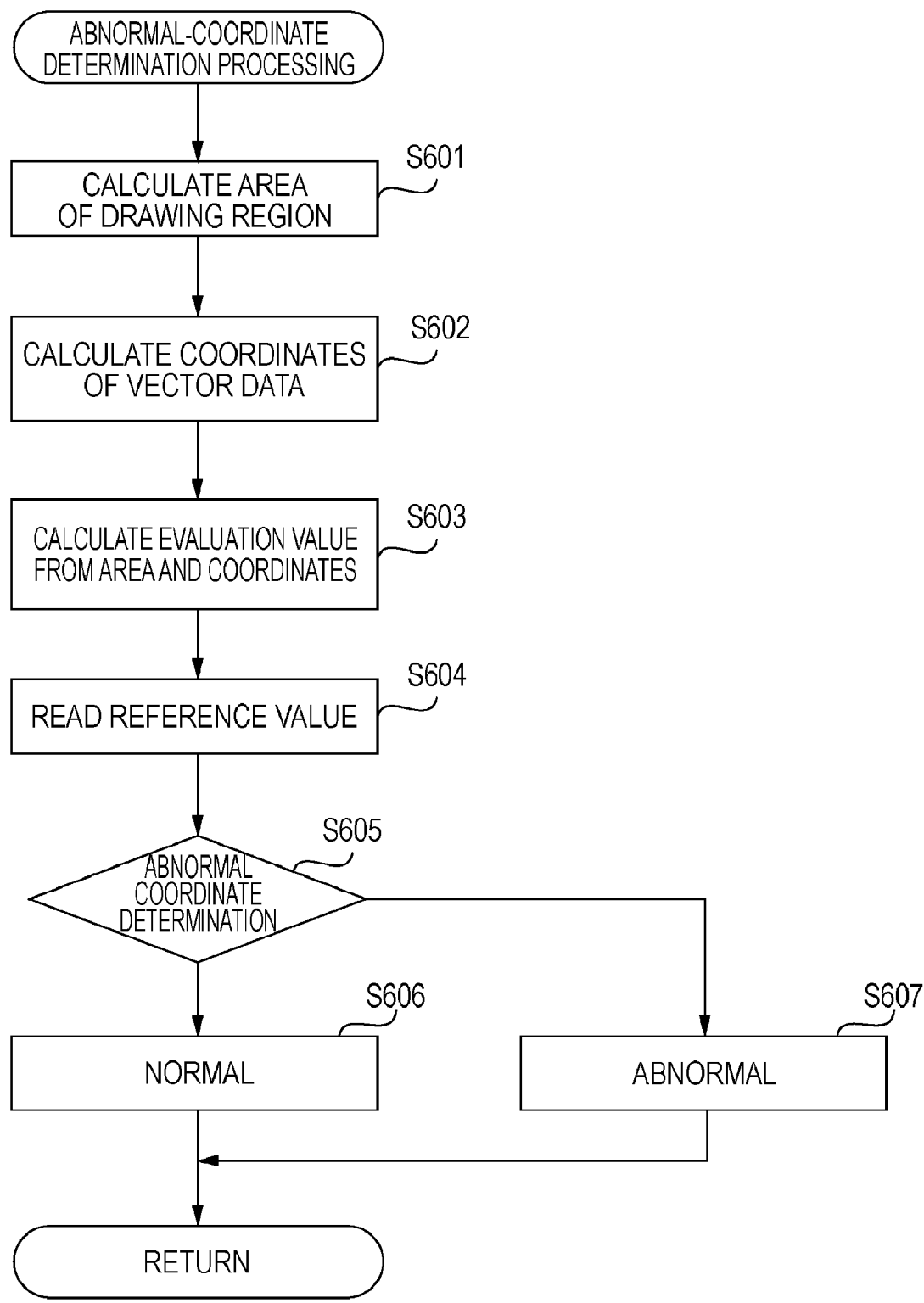
FIG. 6 shows a flowchart illustrating evaluation processing of outline data of the second embodiment.

In step S507, in accordance with the number of coordinates (control points) of the outline vector data which has been subjected to the function-approximation processing, it may be determined whether the outline vector data includes an abnormal coordinate point. In this case, an example of a method for determining whether an abnormal coordinate point is included is shown in FIG. 6. In step S601, an area of a drawing region to be subjected to outlining processing is calculated. In step S602, the number of coordinate points (control points) included in the outline vector data is determined. In step S603, an evaluation value of the number of coordinate points in the drawing area to be processed is calculated in accordance with the area determined in step S601 and the number of coordinate points determined in step S602. For example, a numeric value indicating the number of coordinate points of a vector for individual pixels is determined. In step S604, a preset reference value is read out from the memory unit to be compared with the evaluation value. In step S605, in accordance with a result of the comparison, when it is determined that the outline vector data does not include abnormal coordinate points, the process proceeds to step S606 where a result indicating that the outline vector data is normal is output. On the other hand, when it is determined that the outline vector data includes abnormal coordinate points, the process proceeds to step S607 where a result indicating that the outline vector data is abnormal is output. For example, 0.5 is set as a reference value. When the obtained evaluation value is equal to or smaller than the reference value, it is determined that the outline vector data is normal, whereas when the obtained evaluation value is larger than the reference value, it is determined that the outline vector data is abnormal. The processing is performed to control output of outline vector data which includes a large number of coordinate points or includes complex vectors. Note that although 0.5 is set as a reference value in this embodiment, any value may be set as a reference value. In this case, as the reference value is larger, outline vector data including a large number of coordinate points in units of area is output, whereas as the reference value is smaller, outline vector data including a large number of coordinate points in units of area is not output.

In step S508, the size of the outline vector data is compared with a predetermined threshold value (for example, a value determined in accordance with memory capacity or a desired size of a file to be output) to determine whether the file can be output. When it is determined that the file can be output, the process proceeds to step S509, whereas when it is determined that the file should not be output, the process proceeds to step S510.

In step S509, a description of the outline vector data of the generated region is converted so as to match a format of the output file.

In step S510, similarly to the vectorizing processing performed in step S114, outline vector data (a coarse contour vector) which represents a contour of the object (here, the drawing image) is generated in accordance with the shape of the contour.

In step S511, the outline vector data generated in step S510 is converted into smooth outline vector data using Bezier function approximation, for example.

In step S512, it is determined whether the outline vector data generated in step S511 includes an abnormality. This determination process is the same as that performed in step S507. When it is determined the outline vector data is normal, the process proceeds to step S513, whereas when it is determined the outline vector data is abnormal, the outline data is not output and the process is terminated.

In step S513, the size of the outline vector data is compared with a predetermined threshold value (for example, a value determined in accordance with memory capacity or a desired size of a file to be output) to determine whether the file can be output. When it is determined that the file can be output, the process proceeds to step S514, whereas when it is determined that the file should not be output, the outline vector data is not output and the process is terminated.

In step S514, a description of the outline vector data of the generated region is converted so as to match a format of the output file.

In the second embodiment, when it is determined that the outline vector data includes abnormal coordinate points in step S512 or when it is determined that the file should not be output (error processing), outline vector data is not output and the process is terminated, but the present invention is not limited to this. For example, a binary image of the drawing region may be output or vector data which has not yet been subjected to function approximation may be output. Furthermore, a user may select an output object in accordance with setting.

Third Embodiment

Figure 7:
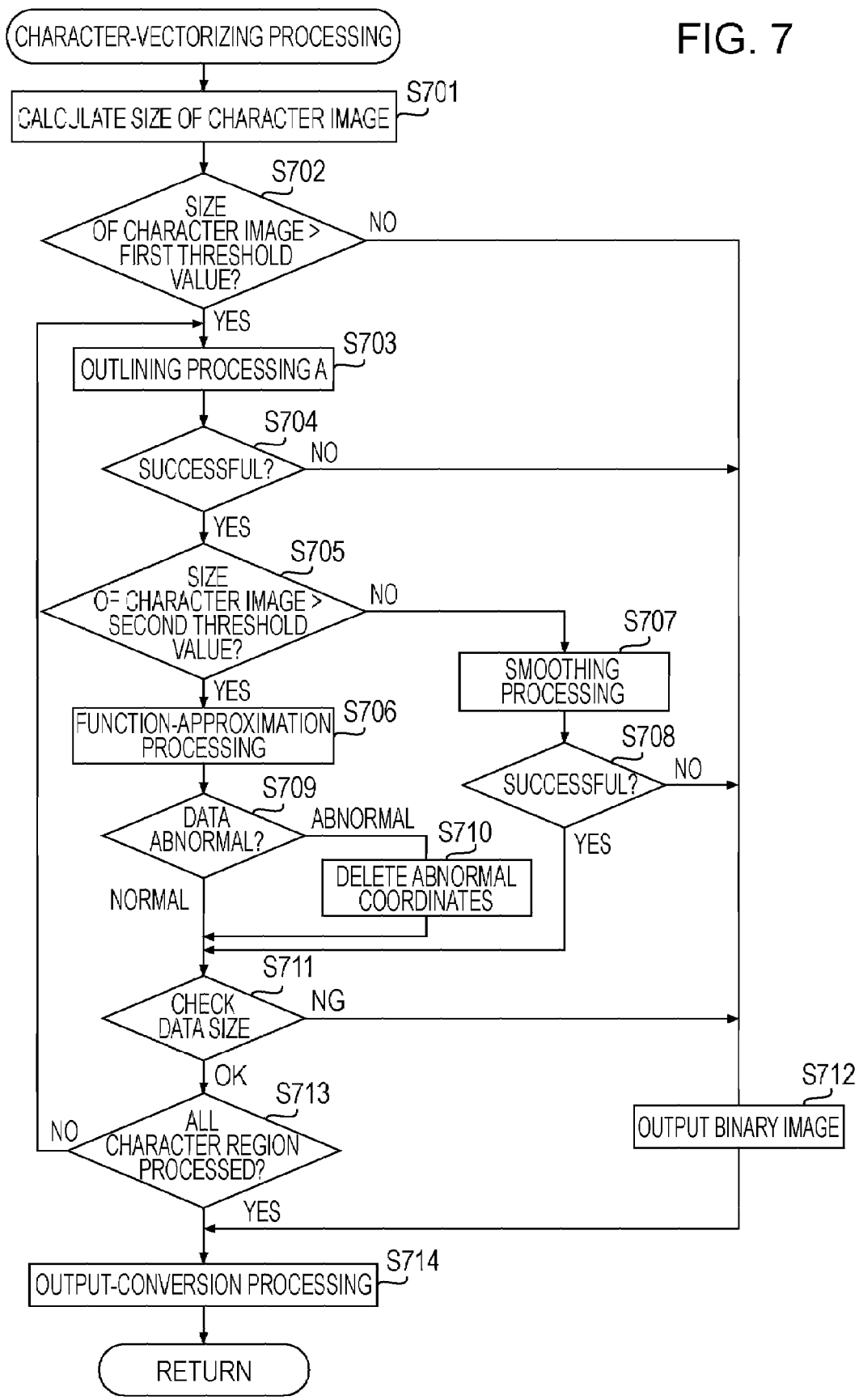
FIG. 7 shows a flowchart illustrating processing of a third embodiment.

A third embodiment concerns processing different from the processing performed when it is determined that a given attribute is a character attribute in step S103 shown in FIG. 1 in the first embodiment. That is, steps S104 to S107 correspond to processing in flowcharts shown in FIG. 7.

In step S701, an average of sizes of the character images in a character region to be processed is obtained. That is, an average of heights of the character images in the character region which has a character attribute is obtained. Note that in the third embodiment, sizes of the character images are calculated on the basis of the height of the characters, but the present invention is not limited to this. Sizes of the character images may be calculated on the basis of areas of circumscribed rectangles of the character images.

In step S702, the size of the character detected in step S701 is compared with a preset threshold value (for example, 4 point). When the size of the character detected in step S701 is equal to or smaller than the threshold value (the size of the character is equal to or smaller than 4 point), the process proceeds to step S712 where a binary image corresponding to the character region is output. Processing then proceeds to step S714. The process in step S702 is performed to prevent an extremely small character from being subjected to vectorizing processing. That is, if the extremely small character is vectorized, outline vector data having high quality may not be obtained.

On the other hand, in step S702, when it is determined that the average of the character sizes is larger than the threshold value, the process proceeds to step S703 where one of a plurality of character images included in the character region is subjected to outlining processing.

In step S704, it is determined whether the outlining processing in step S703 is successful. When an error occurs during the outlining processing, the process proceeds to step S712. On the other hand, when it is determined that the outlining processing is properly terminated, the process proceeds to step S705.

In step S705, the size of the character image which has been subjected to the outlining processing (the size is obtained using the height or the area of the character image) is compared with a second threshold value (for example, 9 point). When the size of the character image is equal to or smaller than the second threshold value (that is, when the character size is equal to or smaller than 9 point), the process proceeds to step S707 where outline vector data representing the character image is subjected to function-approximation processing using only straight-line approximation. In step S708, it is determined whether an error occurred during smoothing processing (the function-approximation processing using only straight-line approximation). When it is determined that an error occurred during smoothing processing, the process proceeds to step S712, whereas when it is determined that the approximation processing is successful, the process proceeds to step S711.

On the other hand, in step S705, when it is determined that the size of the character image is larger than the second threshold value, the process proceeds to step S706 where Bezier approximation processing is performed.

In step S709, it is determined whether control points of the outline vector data which has been subjected to Bezier approximation processing include abnormal coordinate points. When it is determined that abnormal coordinate points are included, the process proceeds to step S710 where the abnormal coordinate points are deleted. Note that if desired outline vector data is not obtained, even when the abnormal coordinate points are deleted (when the considerably large number of abnormal coordinate points are included), the process may proceed to step S712 where a binary image is output.

In step S711, a data size of the generated outline vector data is compared with a predetermined threshold value (for example, a value determined in accordance with memory capacity or a desired size of a file to be output) to determine whether the file can be output. When it is determined that the file can be output, the process proceeds to step S713, whereas when it is determined that the file should not be output, the process proceeds to step S712.

In step S713, it is determined whether all character images included in the character region are subjected to outlining processing. When the determination is affirmative, the process proceeds to step S714, whereas when the determination is negative, the process returns to step S703 and the next character image is subjected to outlining processing.

In step S714, a description of the outline vector data of the generated region is converted so as to match a format of the output file.

In the third embodiment, when the determination is negative in step S704 or S708 or when it is determined that the file should not be output in step S711, a binary image representing the whole character region is output. However, the present invention is not limited to this. A binary image representing a character image portion under processing may be output and the process may proceed to step S713.

Other Embodiments

Exemplary embodiments of the present invention are described above. However, other embodiments in which the present invention is applied to a system, an apparatus, a method, a program, or a storage medium (a recording medium) may be considered. The present invention may be applicable to a system including a plurality of devices or applicable to an apparatus including a single device.

According to the embodiments of the present invention, software programs (programs corresponding to the flowcharts illustrated in the figures in the embodiments) which implement functions of the embodiments described above are directly or remotely supplied to a system or an apparatus. The present invention is implemented by a computer included in the system or the apparatus, which reads out and executes program codes of the supplied programs.

Accordingly, since function processing of the present invention is implemented by means of a computer, the present invention is also implemented by means of program code installed in the computer. That is, the present invention includes computer programs to implement function processing of the present invention.

In this case, the computer programs may be object code, programs executed by an interpreter, or script data supplied to an operating system as long as a program function is included.

Examples of a recording medium for supplying programs include: a floppy disk, a hard disk, an optical disk, an MO (a magneto-optical disk), a CD-ROM (a compact disk read-only memory), a CD-R (a compact disk recordable), a CD-RW (a compact disk rewritable), a magnetic tape, an nonvolatile memory card, a ROM (read-only memory), and a DVD (a digital versatile disk) including a DVD-ROM (a digital versatile disk read-only memory) and a DVD-R (a digital versatile disk recordable).

Programs may be supplied by being downloaded to a recording medium such as a hard disk through the Internet using a browser of a client computer. That is, computer programs of the present invention or compressed files including automated installation function are downloaded through the Internet. Furthermore, program code constituting the programs of the present invention may be divided and stored into a plurality of files and the files may be downloaded from different servers. A server which has program files implementing function processing of the present invention by means of a computer may include the program files being accessible by a plurality of users and being downloaded from the server.

The functions of the embodiments described above are also implemented by reading and executing programs using a computer. Furthermore, the functions of the embodiments described above may be implemented when an OS operating on the computer performs part of or all actual processing in accordance with an instruction of the programs.

The functions of the embodiments described above can also be implemented by writing programs read from a recording medium into a memory unit provided in a function expansion board inserted into a computer or a function expansion unit connected to a computer. That is, the functions of the embodiments described above are also implemented when a CPU or the like provided in the function expansion board or a function expansion unit performs part of or all actual processing in accordance with an instruction of the programs.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-135072 filed May 15, 2006, which is hereby incorporated by reference herein in its entirety.

What is claimed is:

1. An image processing apparatus comprising:
a region segmentation unit configured to divide an input image into a plurality of regions, wherein the input image is not outline data;
a selection unit configured to determine whether each of the regions is suitable for thinning processing and configured to select outlining processing to be executed based on a result of the determination;
an outlining unit configured to generate outline data for each of the regions using the outlining processing selected by the selection unit; and
an outputting unit configured to output outline data generated by the outlining unit,
wherein the outlining processing selected by the selection unit includes first outlining processing of generating outline data based on a contour of an object included in each of the regions and second outlining processing of generating outline data based on the object which is included in each of the regions and which has been subjected to the thinning processing, and
wherein the selection unit determines whether regions having a drawing attribute among the regions are suitable for thinning processing for individual regions and when the determination is affirmative, the second outlining processing is selected and when the determination is negative, the first outlining processing is selected.

2. An image processing apparatus comprising:
a region segmentation unit configured to divide an input image into a plurality of regions, wherein the input image is not outline data;
a selection unit configured to determine whether each of the regions is suitable for thinning processing and configured to select outlining processing to be executed based on a result of the determination;
an outlining unit configured to generate outline data for each of the regions using the outlining processing selected by the selection unit; and
an outputting unit configured to output outline data generated by the outlining unit,
wherein the outlining processing selected by the selection unit includes first outlining processing of generating outline data based on a contour of an object included in each of the regions and second outlining processing of generating outline data based on the object which is included in each of the regions and which has been subjected to the thinning processing, and
wherein the selection unit selects the first outlining processing when it is determined that a region to be processed has a character attribute.

3. The image processing apparatus according to claim 1, wherein the outlining unit further determines whether to output the outline data generated by the selected outlining processing based on whether the generated outlining data is normal data.

4. The image processing apparatus according to claim 1, wherein the outlining unit generates the outline data by performing function approximation on the outline vector data generated based on an object included in each of the regions.

5. The image processing apparatus according to claim 4, further comprising:
a setting unit configured to set whether to output the outline data and whether to output outline data which has not yet been subjected to function approximation when the generated outline data is abnormal.

6. The image processing apparatus according to claim 4, wherein the outlining unit determines, based on the size of a character image, whether function-approximation processing using only straight-line approximation is performed when the character image included in regions having a character attribute is subjected to outlining processing and function-approximation processing.

7. The image processing apparatus according to claim 1, wherein the outlining unit determines whether the outlining processing is performed on a character image included in each of the regions having a character attribute based on the size of the character image.

8. The image processing apparatus according to claim 7, wherein the outlining unit outputs a binary image of a character image which is determined not to be subjected to the outlining processing.

9. An image processing apparatus comprising:
a region segmentation unit configured to divide an input image into a plurality of regions;
a selection unit configured to determine whether each of the regions is suitable for thinning processing and configured to select outlining processing to be executed based on a result of the determination;
an outlining unit configured to generate outline data for each of the regions using the outlining processing selected by the selection unit; and
an outputting unit configured to output outline data generated by the outlining unit,
wherein the outlining unit outputs a binary image when the size of a character image included in a region having a character attribute is equal to or lower than a first threshold value, and performs outlining processing when the size of the character image is larger than the first threshold value, and
the outlining unit further performs function-approximation processing using only straight-line approximation on the character image which has been subjected to the outlining processing when the size of the character image is equal to or smaller than a second threshold value, and performs function-approximation processing using Bezier approximation processing on the character image which has been subjected to the outlining processing when the size of the character image is larger than the second threshold value.

10. An image processing apparatus comprising:
a region segmentation unit configured to divide an input image into a plurality of regions;
an outlining unit configured to generate outline data for a character image included in a region having a character attribute among the divided regions using outlining processing;
a function approximation unit configured to perform function-approximation processing using only straight-line approximation on the generated outline data when the size of the character image is equal to or smaller than a second threshold value, and perform function-approximation processing using Bezier approximation processing on the generated outline data when the size of the character image is larger than the second threshold value; and
an output unit configured to output outline data to which the function-approximation processing has been performed.

11. The image processing apparatus according to claim 10, further comprising:
a determining unit configured to determine that a binary image is output when the size of the character image included in the region having a character attribute is equal to or smaller than a first threshold value, and configured to determine that outlining processing by the outlining unit and function-approximation processing by the function approximation unit are performed when the size of the character image is larger than the first threshold value.

12. An image processing method comprising:
dividing an input image into a plurality of regions, wherein the input image is not outline data;
determining whether each of the divided regions is suitable for thinning processing;
selecting outlining processing to be executed based on a result of the determination;
generating outline data for each of the regions using the selected outlining processing; and
outputting generated outline data
wherein the outlining processing to be selected in the selecting step includes first outlining processing of generating outline data based on a contour of an object included in each of the regions and second outlining processing of generating outline data based on the object which is included in each of the regions and which has been subjected to the thinning processing, and
wherein it is determined in the selecting step whether regions having a drawing attribute among the regions are suitable for thinning processing for individual regions and when the determination is affirmative, the second outlining processing is selected and when the determination is negative, the first outlining processing is selected.

13. An image processing method comprising:
dividing an input image into a plurality of regions;
generating outline data for a character image included in a region having a character attribute among the divided regions using outlining processing;
performing function-approximation processing using only straight-line approximation on the generated outline data when the size of the character image is equal to or smaller than a second threshold value, and performing function-approximation processing using Bezier approximation processing on the generated outline data when the size of the character image is larger than the second threshold value; and
outputting outline data to which the function-approximation processing has been performed.

14. A non-transitory computer-readable storage medium which stores a computer program executed by a computer, the computer program comprising steps of:
dividing an input image into a plurality of regions, wherein the input image is not outline data;
determining whether each of the divided regions is suitable for thinning processing;
selecting outlining processing to be executed based on a result of the determination;

generating outline data for each of the regions using the selected outlining processing; and outputting generated outline data, wherein the outlining processing to be selected in the selecting step includes first outlining processing of generating outline data based on a contour of an object included in each of the regions and second outlining processing of generating outline data based on the object which is included in each of the regions and which has been subjected to the thinning processing, and wherein it is determined in the selecting step whether regions having a drawing attribute among the regions are suitable for thinning processing for individual regions and when the determination is affirmative, the second outlining processing is selected and when the determination is negative, the first outlining processing is selected.

15. A non-transitory computer-readable storage medium which stores a computer program executed by a computer, the computer program comprising steps of:

dividing an input image into a plurality of regions, wherein the input image is not outline data;

determining whether each of the divided regions is suitable for thinning processing;

selecting outlining processing to be executed based on a result of the determination;

generating outline data for each of the regions using the selected outlining processing; and outputting generated outline data, wherein the selected outlining processing includes first outlining processing of generating outline data based on a contour of an object included in each of the regions and second outlining processing of generating outline data based on the object which is included in each of the regions and which has been subjected to the thinning processing, and wherein the first outlining processing is selected when it is determined that a region to be processed has a character attribute.

16. A non-transitory computer-readable storage medium which stores a computer program executed by a computer, the computer program comprising steps of:

dividing an input image into a plurality of regions;

generating outline data for a character image included in a region having a character attribute among the divided regions using outlining processing;

performing function-approximation processing using only straight-line approximation on the generated outline data when the size of the character image is equal to or smaller than a second threshold value, and performing function-approximation processing using Bezier approximation processing on the generated outline data when the size of the character image is larger than the second threshold value; and outputting outline data to which the function-approximation processing has been performed.

17. The non-transitory computer-readable storage medium according to claim 16, which stores a computer program executed by a computer, the computer program further comprising the step of:

determining that a binary image is output when the size of the character image included in the region having a character attribute is equal to or smaller than the first threshold value, performing the outlining processing and the function-approximation processing when the size of the character image is larger than the first threshold value, and determining that the outline data which has been subjected to the function-approximation processing is output.

18. An image processing apparatus comprising:

a region segmentation unit configured to divide an input image into a plurality of regions;

an outlining unit configured to generate outline data for a character image included in a region having a character attribute among the divided regions using outlining processing;

a function approximation unit configured to perform function-approximation processing using straight-line approximation on the generated outline data when the size of the character image which has been subjected to the outlining processing is equal to or smaller than a second threshold value, and perform function-approximation processing using curve approximation on the generated outline data when the size of the character image is larger than the second threshold value; and an output unit configured to output the outline data to which the function-approximation processing has been performed.

19. The image processing apparatus according to claim 18, further comprising:

a determining unit configured to determine that a binary image is output when the size of the character image included in the region having a character attribute is equal to or smaller than a first threshold value, and configured to determine that outlining processing by the outlining unit and function-approximation processing by the function approximation unit are performed when the size of the character image is larger than the first threshold value.

20. An image processing method comprising:

a segmentation step of dividing an input image into a plurality of regions;

an outlining step of generating outline data for a character image included in a region having a character attribute among the divided regions using outlining processing;

a function-approximation step of performing function-approximation processing using straight-line approximation on the generated outline data when the size of the character image which has been subjected to the outlining processing is equal to or smaller than a second threshold value, and performing function-approximation processing using curve approximation on the generated outline data when the size of the character image is larger than the second threshold value; and an output unit configured to output the outline data to which the function-approximation processing has been performed.

21. A non-transitory computer-readable storage medium which stores a computer program executed by a computer, the computer program comprising:

a segmentation step of dividing an input image into a plurality of regions;

an outlining step of generating outline data for a character image included in a region having a character attribute among the divided regions using outlining processing;

a function-approximation step of performing function-approximation processing using straight-line approximation on the generated outline data when the size of the character image which has been subjected to the outlining processing is equal to or smaller than a second threshold value, and performing function-approximation processing using curve approximation on the generated outline data when the size of the character image is larger than the second threshold value; and an output unit configured to output the outline data to which the function-approximation processing has been performed.

22. An image processing method comprising steps of:

dividing an input image into a plurality of regions, wherein the input image is not outline data;

determining whether each of the divided regions is suitable for thinning processing;

selecting outlining processing to be executed based on a result of the determination;

generating outline data for each of the regions using the selected outlining processing; and outputting generated outline data, wherein the selected outlining processing includes first outlining processing of generating outline data based on a contour of an object included in each of the regions and second outlining processing of generating outline data based on the object which is included in each of the regions and which has been subjected to the thinning processing, and wherein the first outlining processing is selected when it is determined that a region to be processed has a character attribute.

23. An image processing method comprising:

dividing an input image into a plurality of regions;

determining whether each of the regions is suitable for thinning processing;

selecting outlining processing to be executed based on a result of the determination;

generating outline data for each of the regions using the selected outlining processing;

outputting outline data generated by the outlining unit;

outputting a binary image when the size of a character image included in a region having a character attribute is equal to or lower than a first threshold value;

performing outlining processing when the size of the character image is larger than the first threshold value;

performing function-approximation processing using only straight-line approximation on the character image which has been subjected to the outlining processing when the size of the character image is equal to or smaller than a second threshold; and performing function-approximation processing using Bezier approximation processing on the character image which has been subjected to the outlining processing when the size of the character image is larger than the second threshold value.

24. A non-transitory computer-readable storage medium which stores a computer program executed by a computer, the computer program comprising:

dividing an input image into a plurality of regions;

determining whether each of the regions is suitable for thinning processing;

selecting outlining processing to be executed based on a result of the determination;

generating outline data for each of the regions using the selected outlining processing;

outputting outline data generated by the outlining unit;

outputting a binary image when the size of a character image included in a region having a character attribute is equal to or lower than a first threshold value;

performing outlining processing when the size of the character image is larger than the first threshold value;

performing function-approximation processing using only straight-line approximation on the character image which has been subjected to the outlining processing when the size of the character image is equal to or smaller than a second threshold; and performing function-approximation processing using Bezier approximation processing on the character image which has been subjected to the outlining processing when the size of the character image is larger than the second threshold value.

\* \* \* \* \*